(12) United States Patent
Wilkinson

(10) Patent No.: US 10,745,828 B2
(45) Date of Patent: Aug. 18, 2020

(54) PROCESS OF MAKING POLYACRYLONITRILE FIBERS

(71) Applicant: International Fibers, Ltd., Fairfax, VA (US)

(72) Inventor: W. Kenneth Wilkinson, Waynesboro, VA (US)

(73) Assignee: International Fibers, LTD, Fairfax, VA (US)

( * ) Notice: Subject to any disclaimer, the term of this patent is extended or adjusted under 35 U.S.C. 154(b) by 950 days.

(21) Appl. No.: 14/999,681

(22) Filed: Jun. 13, 2016

(65) Prior Publication Data

US 2017/0002482 A1 Jan. 5, 2017

Related U.S. Application Data

(60) Division of application No. 13/761,565, filed on Feb. 7, 2013, now abandoned, which is a division of application No. 12/585,304, filed on Sep. 10, 2009, now Pat. No. 8,372,323, which is a continuation of application No. 12/073,376, filed on Mar. 5, 2008, now Pat. No. 7,964,134.

(51) Int. Cl.

| | |
|---|---|
| *D01D 5/06* | (2006.01) |
| *D01F 6/38* | (2006.01) |
| *D01F 9/22* | (2006.01) |
| *B29D 99/00* | (2010.01) |

(52) U.S. Cl.
CPC ............ *D01D 5/06* (2013.01); *B29D 99/0078* (2013.01); *D01F 6/38* (2013.01); *D01F 9/225* (2013.01); *Y10T 428/2918* (2015.01)

(58) Field of Classification Search
None
See application file for complete search history.

(56) References Cited

U.S. PATENT DOCUMENTS 5,804,108 A * 9/1998 Wilkinson ............... D01F 9/22
264/182

* cited by examiner

*Primary Examiner* — Jacob T Minskey
*Assistant Examiner* — Melody Tsui
(74) *Attorney, Agent, or Firm* — Leander F. Aulisio

(57) ABSTRACT

A process for preparing a PANOX fiber comprising: obtaining an acrylonitrile copolymer, wherein the copolymer contains at least about 2% by weight itaconic acid comonomer; forming a spin dope from the copolymer; wet spinning the spin dope to obtain gelled filaments; contacting the gelled filaments with ammonia activator in an aqueous imbibation bath; bundling the gelled filaments to obtain a fiber; removing solvent from the fiber; drawing the fiber; densifying the fiber by heating the fiber up to about 400 degrees C. for a time of about 15 minutes in a rapid densification zone; and withdrawing a PANOX fiber from the densification zone.

1 Claim, 4 Drawing Sheets

PROCESS OF MAKING POLYACRYLONITRILE FIBERS

This is a divisional of U.S. application Ser. No. 13/761,565, which was filed on Feb. 7, 2013, which is a divisional of U.S. application Ser. No. 12/585,304, which was filed on Sep. 10, 2009, which is now U.S. Pat. No. 8,372,323, with grant date of Feb. 12, 2013; and is based on U.S. patent application Ser. No. 12/073,376 which was filed on Mar. 5, 2008 and is now U.S. Pat. No. 7,964,134; and is based on U.S. patent application Ser. No. 11/311,246 which was filed on Dec. 20, 2005 and is based on U.S. provisional application 60/636,887 filed on Dec. 20, 2004.

BACKGROUND OF THE INVENTION

The prior art processes for the preparation of either PANOX (oxidized polyacrylonitrile) fibers or carbon fibers employs high heat and extended periods of time to obtain the final product. The final PANOX fiber or carbon fiber product in the prior art is often a flawed product that contains weak spots and micro-bubbles. This is because present processes do not control the rapid increase in heat when the fiber is heated above its fusion point. The prior art strategy increases the temperature of a PAN (polyacrylonitrile) fiber to just below its fusion point. Then the PAN fiber is SLOWLY heated for an extended period of time (approximately 3-4 hours). "Burn out" of the fiber is thus avoided. "Burn out" of the fiber occurs when the temperature of the fiber reaches the fusion point of the fiber. The internal temperature of the fiber then rapidly shoots up to 400 degrees C. and above. The result is that the fiber is destroyed. The fiber employed in prior art processes does not begin to cross-link until late in the heating cycle (near the fusion point of the fiber). Thus, the prior art methods depend on slowing down the heating process, and then slowly raising the temperature over the next couple of hours.

Prior art processes for preparing either PANOX fiber or carbon fiber include the use of about three or four monomers for preparing a polyacrylonitrile copolymer. The monomers can be: acrylonitrile (90-98% by wt.), itaconic acid (2-10% by weight), ethyl acrylate (2-5% by wt.), and vinyl sulfonic acid (1-3% by weight). In a first step, the four monomers are polymerized as by a precipitation polymerization process in the presence of a Redox catalyst. The resultant polyacrylonitrile copolymer is then wet spun into fibers. The fibers have a density of about 1.2 grams/cc. The PAN (polyacrylonitrile) fibers are then removed to a first oxidation zone. The fibers are SLOWLY heated in an energy intensive process for a time of about 3-4 hours. The process is carefully monitored to prevent runaway heating from the interior of the fibers. This process is not cost effective because of the extended heating cycle.

PANOX (oxidized polyacrylonitrile) fibers are withdrawn from the first oxidation zone. The density of the PANOX fibers is about 1.4 grams/cc. The PANOX fibers can be used in areas of technology such as sporting equipment and the like. If pristine carbon fibers are desired, the PANOX fibers are removed to a second oxidation zone which is a high temperature carbonization unit. Temperatures in the carbonization unit are from 1000-2000 degrees C., or even higher. All atoms other than the carbon atoms are vaporized away from the fibers to obtain a pristine carbon fiber.

U.S. Pat. No. 5,462,799 discloses the preparation of a carbon fiber wherein a precursor PAN-fiber is oxidized, carbonized and if necessary graphitized to make the carbon fiber.

U.S. Pat. No. 5,281,477 discloses the preparation of a carbon fiber having high tenacity and high modulus of elasticity. Pretreated fibers are passed through a series of three carbonization zones.

The problems of the current methodology for preparation of carbon fiber are as follows: (1) failure to recognize the fact that amidines are the true initiators in the preparation of carbon fiber; (2) failure to recognize that metal ions "poison" the fiber at every step of the process; and (3) failure to recognize that the first oxidation step can be performed in a substantially reduced time frame.

Therefore there is a need for a process of preparing superior PANOX fiber or carbon fiber that overcomes the drawbacks of the prior art.

SUMMARY OF THE INVENTION

The present invention relates to an improvement in the process for preparing PANOX fiber or carbon fiber in accordance with the disclosures found in U.S. Pat. No. 5,804,108; issued to Wilkinson; U.S. Pat. No. 6,054,214, issued to Wilkinson, and US PGPUB 2006/0134413, submitted by Wilkinson, incorporated in their entirety herein by reference. The disclosures of the '108, '214 patents and the '413 published application, rely on the preparation of a uniquely balanced polymeric precursor in order to achieve a carbon fiber precursor (a PANOX fiber) that has superior modulus when compared with prior art PANOX fiber. The modulus of the fiber is improved by at least 2 and ½ times when compared with prior art PANOX fibers.

The present invention relates to a process for preparing a PANOX fiber comprising: obtaining an acrylonitrile copolymer and forming a "spin dope". The "spin dope" is added to a wet spinning zone, wherein the wet spinning zone comprises a die plate. In a preferred embodiment, the die plate contains 2100 holes. Thus 2100 filaments can be obtained from a single die plate. The "spin dope" is passed through the die plate to obtain gelled filaments. The gelled filaments have a substantially circular cross-section. Without removing solvent from the filaments, the gelled filaments are added to an aqueous imbibation bath containing an activator such as ammonia. The gelled filaments are under minimum tension. Minimum tension refers to a pull on the filaments that is of strength substantially sufficient to move the filaments from the die plate to the aqueous imbibation bath, but without drawing the filaments. Preferably, the tension on the filaments is substantially zero. In an embodiment of the present invention, the gelled filaments are pulled by gravity into the imbibation bath without tension placed on the filaments. It is critical to the process of the present invention that the filaments enter the aqueous imbibation bath in a gelled state. Thus the filaments cannot be drawn or washed, since drawing causes the filaments to solidify and form an outer skin; and washing of the filaments removes the solvent inherent in the filaments, causing the filaments to be in a non-gel state.

The aqueous imbibation bath comprises water and an activator. Preferably, the activator is a member selected from the group consisting of low molecular weight primary amine, low molecular weight secondary amine and ammonia. By "low molecular weight amine" is meant an organic amine compound containing one to six carbon atoms. The gelled filaments are imbibed with the activator to obtain activator-loaded gelled filaments. The activator-loaded gelled filaments are removed from the aqueous imbibation bath. They are then bundled or combined on an uptake reel or the like to obtain an activator-loaded fiber. The fiber is then added to a solvent extraction zone which comprises an aqueous draw bath. Solvent is removed from the activator-loaded fiber. Also, the fiber is drawn about 7× to about 9× while in the bath to obtain a drawn fiber. The drawn fiber has a density of about 1.18 grams per cubic centimeter. The drawn fiber is optionally passed over a series of heated rolls to obtain a relaxed fiber. In a preferred embodiment, the fiber is relaxed about 8% to about 12%. The fiber is then added to a rapid densification unit. In a preferred embodiment, the rapid densification unit comprises a set of three heating rolls. The fiber is heated for about 8 minutes to about 15 minutes in the rapid densification unit. The heating step is conducted sequentially, by employing a heating cycle beginning at about 190 degrees C. and ending at about 400 degrees C., to obtain the PANOX fiber. The density of the heated fiber is about 1.40 grams per cubic centimeter to about 1.5 grams per cubic centimeter.

DETAILED DESCRIPTION OF THE INVENTION

Figure 1:
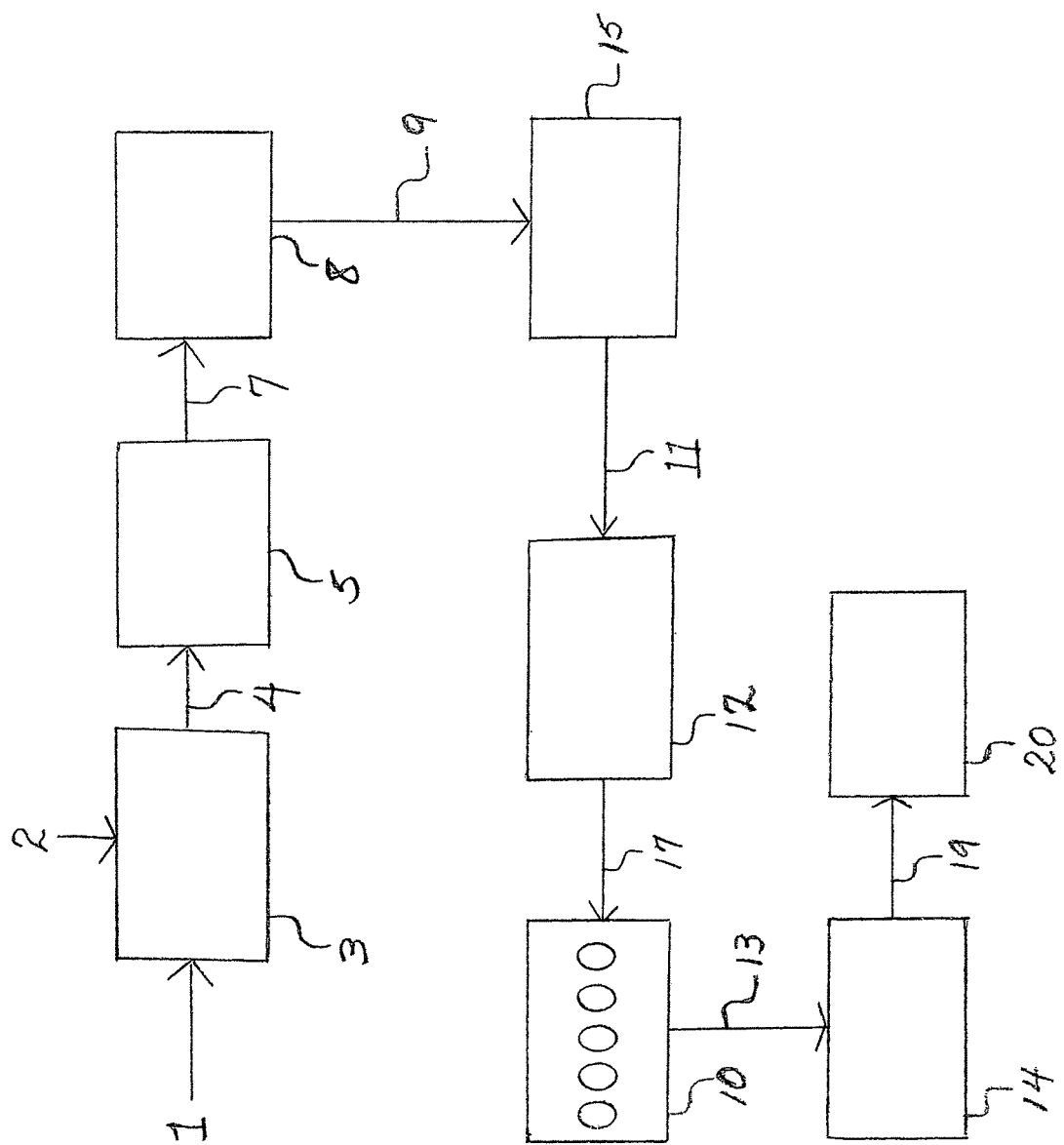
FIG. 1 is a flow diagram of a process for preparing PANOX fiber according to the present invention.

The present process overcomes the failures of the prior art processes as practiced today. In a preferred embodiment, two monomers comprising acrylonitrile (95% by wt.) and itaconic acid (5% by wt.) are added to a precipitation polymerization reactor along with a redox catalyst. The catalyst is preferably a bisulfite catalyst. No metal-containing or metal ion-containing solvents are employed. No vinyl sulfonic acid monomers are employed. An acrylonitrile copolymer is removed from the polymerization reactor, purified, dried and then emulsified with a solvent such as DMF to form a "spin dope". The "spin dope" is then added to a wet spinning zone for spinning into PAN (polyacrylonitrile) filaments. The PAN filaments have a density of about 1.18 grams/cc. The wet spun PAN filaments, while still in the gel state, are then added to an aqueous imbibation bath. The wet spun PAN filaments contain a substantial amount of solvent. The aqueous imbibation bath contains water and ammonia. The ammonia is present in the bath in an amount of about 5% by volume to about 10% by volume. The temperature of the bath is maintained at about 40 degrees C. to about 80 degrees C. Preferably, the temperature of the aqueous imbibation bath is about 60 degrees C. The filaments are in a gel state. Ammonia activator penetrates into the gelled filaments in a substantially uniform fashion in a time of about 5 milliseconds. Activator-loaded gelled filaments are then withdrawn from the aqueous imbibation bath. They are then bundled or combined into an activator-loaded fiber.

The fiber is added to a solvent extraction unit. The solvent extraction unit comprises an aqueous draw bath comprising water. The temperature of the aqueous draw bath is maintained at a temperature of about 100 degrees C. Solvent is removed from the fiber. Also, the fiber is stretched about 7×. The drawing of the fiber in the aqueous draw bath allows for development of superior physical properties in the PAN fiber. In an alternative embodiment, the activator-loaded fiber is not added to a solvent extraction unit, but rather added to a set of heated rolls for stretching. The rolls are maintained at a temperature of about 160 degrees C. Solvent is removed and captured as the fiber passes over the rolls.

The PAN fiber is then removed to a rapid densification unit. Oxygen is not needed for the rapid densification step, but it does not need to be excluded. Preferably, the fiber is heated for a time of about 12 minutes. The heating of the fiber is always below its fusion point. Heating begins at about 190-200 degrees C. and ends at about 400 degrees C. The preferred heating cycle is to heat the fiber at 240 degrees C. for four minutes, then to heat the fiber at 250 degrees C. for four minutes, and finally to heat the fiber at 260 degrees C. for another four minutes. A densified fiber (PANOX fiber), is then removed from the rapid densification unit. This densified fiber is called a PANOX fiber in the present description, even if the fiber is densified in an environment that excludes oxygen. The fiber has a density of about 1.4 grams/cc to about 1.6 grams/cc.

The acrylonitrile (PAN) copolymer is prepared from a mixture of comonomers, the mixture containing acrylonitrile monomer in an amount of about 95% by weight, and itaconic acid in an amount of about 5% by weight. The wet-spun PAN copolymer gelled filaments are immersed in an aqueous imbibation bath containing an excess of ammonia. By "excess of ammonia" is meant that there is more than enough ammonia present in the aqueous bath to react with all of the pendant carboxylic acid groups present in the PAN copolymer. While immersed in the aqueous imbibation bath, the filaments are imbibed with ammonia, as ammonia activator penetrates into the central regions of the filaments. The filaments are imbibed with activator in a time of about five milliseconds. The activator is homogeneously dispersed throughout the fiber. In prior art methods, activator remains on or near the surface of the fiber, with possibly a minor amount of activator penetrating to the core of the fiber.

Referring to FIG. 1, a flow diagram of a process for preparing PANOX fiber according to the present invention is presented. An acrylonitrile (PAN) copolymer 1 is added to a solvent 2 such as DMF to prepare a "spin dope". The "spin dope" is then transferred to a spinning unit 5 as by first transfer means 4. In a preferred embodiment, the spinning unit 5 is a wet spinning unit. Wet spinning allows formation of filaments having substantially circular cross-sections. Dry spinning causes the filaments to have dog-bone shaped cross-sections, which shape is not desirable for preparing PANOX fiber.

Wet spun filaments are removed from the spinning unit 5, and enter the aqueous imbibation bath 8. Second transfer means 7 removes the wet spun PAN filaments, which have a density of about 1.18 g/cc., from the spinning unit 5. The filaments are transferred to the aqueous imbibation bath 8. The aqueous imbibation bath 8 comprises water and ammonia. The ammonia activator is present in the bath in an amount sufficient to react with all of the carboxylic acid groups in the wet spun PAN filaments. The carboxylic acid groups pendant from the PAN copolymer backbone are a result of the itaconic acid monomer used in a polymerization reaction for preparing the PAN copolymer. Ammonia molecules are grabbed by the pendant carboxylic acid groups to form an organic salt complex. This formation of salt complexes is complete in about 5 milliseconds.

Activated PAN filaments (filaments that have salt complexes pendant from their polymeric backbone) are then removed from the aqueous imbibation bath 8 as by a third transfer means 9. The activated PAN filaments are then bundled or combined into a PAN fiber in a collection unit 15. A fourth transfer means 11 receives the activated PAN fiber and removes it to a solvent extraction zone 12 which comprises an aqueous draw bath and a device for drawing the fiber. While immersed in the aqueous draw bath, the activated PAN fiber is drawn at least about 7× to set the physical properties of the fiber. Also, solvent is removed from the fiber. The drawn PAN fiber can then optionally be added to a relaxation zone 10, which can comprise a set of steamed rollers, in order to relax the drawn PAN fiber. Drawn PAN fiber is relaxed at least about 8% to about 12%. Preferably, the PAN fiber is relaxed about 10% in the relaxation zone 10.

The drawn PAN fiber, imbibed with activator, is removed as by sixth transfer means 13 to a rapid densification unit 14. In a preferred embodiment, the rapid densification unit 14 comprises a set of three heating rolls (not shown). A first heating roll is maintained at a temperature of about 240 degrees C. The drawn PAN fiber remains on the first heating roll for a time of about 4 minutes. It is then removed to a second heating roll that is maintained at a temperature of about 250 degrees C. The drawn PAN fiber remains on the second heating roll for a time of about four minutes. It is then removed to a third heating roll that is maintained at a temperature of about 260 degrees C. The drawn PAN fiber remains on the third heating roll for a time of about four minutes. Thus, the total amount of time that the PAN fiber remains in the rapid densification unit 14 is about twelve minutes. A densified PAN fiber (PANOX fiber) is removed from the rapid densification unit 14. This PANOX fiber, although not the same as pristine carbon fiber, can be employed in many areas of technology.

If pristine carbon fiber is desired, PANOX fiber is removed as by a seventh transfer means 19 to a carbonization unit 20 which contains an inert atmosphere such as nitrogen gas or the like. The conversion temperature in the carbonization unit 20 is in the range of about 1000 degrees C. to about 2000 degrees C. or higher. The PANOX fiber is converted into pristine carbon fiber. The pristine carbon fiber contains only carbon atoms in its molecular structure.

Figure 2:
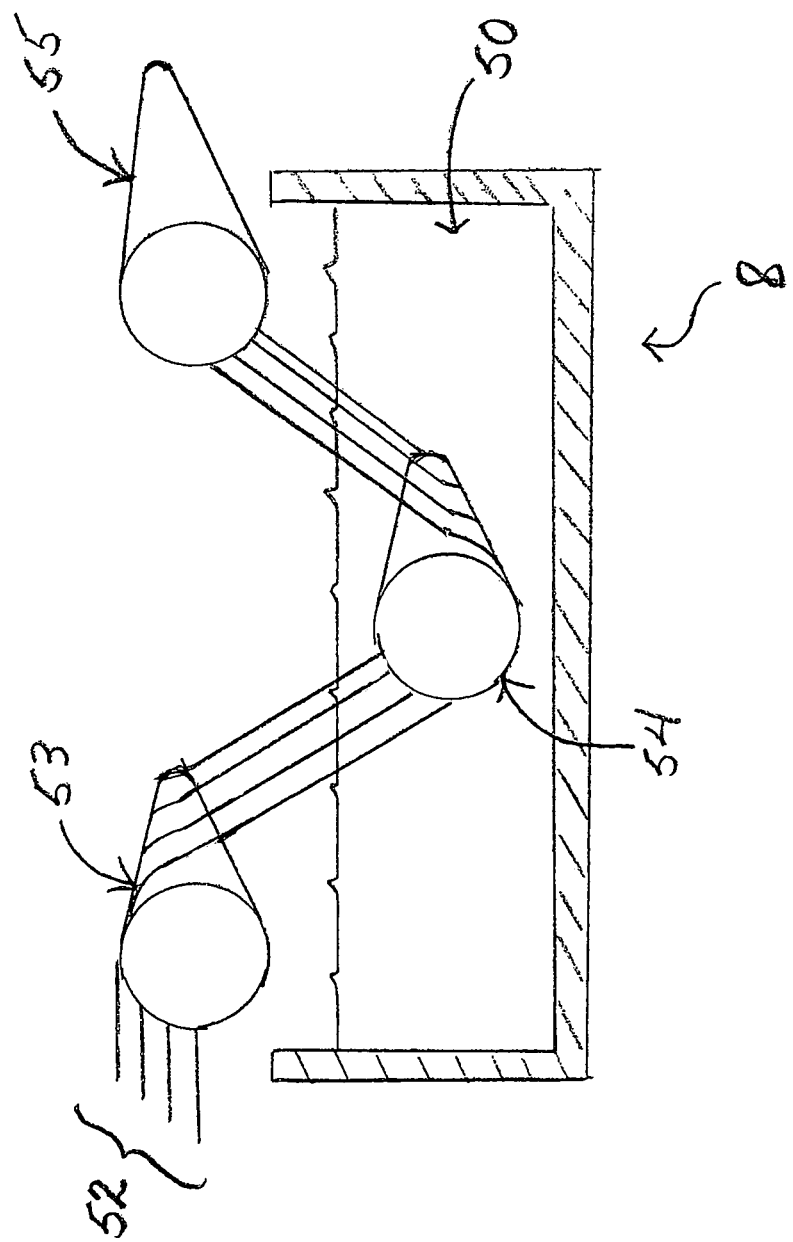
FIG. 2 is a representation of an aqueous imbibation bath of the present invention.

Referring to FIG. 2, an aqueous imbibation bath 8 is represented. The aqueous imbibation bath 8 contains an amount of water solution 50 sufficient to immerse gelled filaments 52, wherein the filaments are exiting from a die plate in a wet spinning unit (not shown). A water solution 50 in the aqueous imbibation bath 8 contains an amount of ammonia or some other activator (a low molecular weight primary or secondary amine). The ammonia (or other activator) is present in an amount sufficient to neutralize all of the pendant organic carboxylic acid groups on an acrylonitrile copolymer that was employed in preparing gelled filaments 52. In an embodiment of the present invention, the aqueous imbibation bath 8 is maintained at a temperature of about 60 degrees C. Gelled filaments 52 are passed over a feed roll 53 and enter the ammoniacal water solution 50. Ammonia activator is imbibed by the filaments 52. Filaments 52 are withdrawn from ammoniacal water solution 50 by uptake roll 55.

Figure 3:
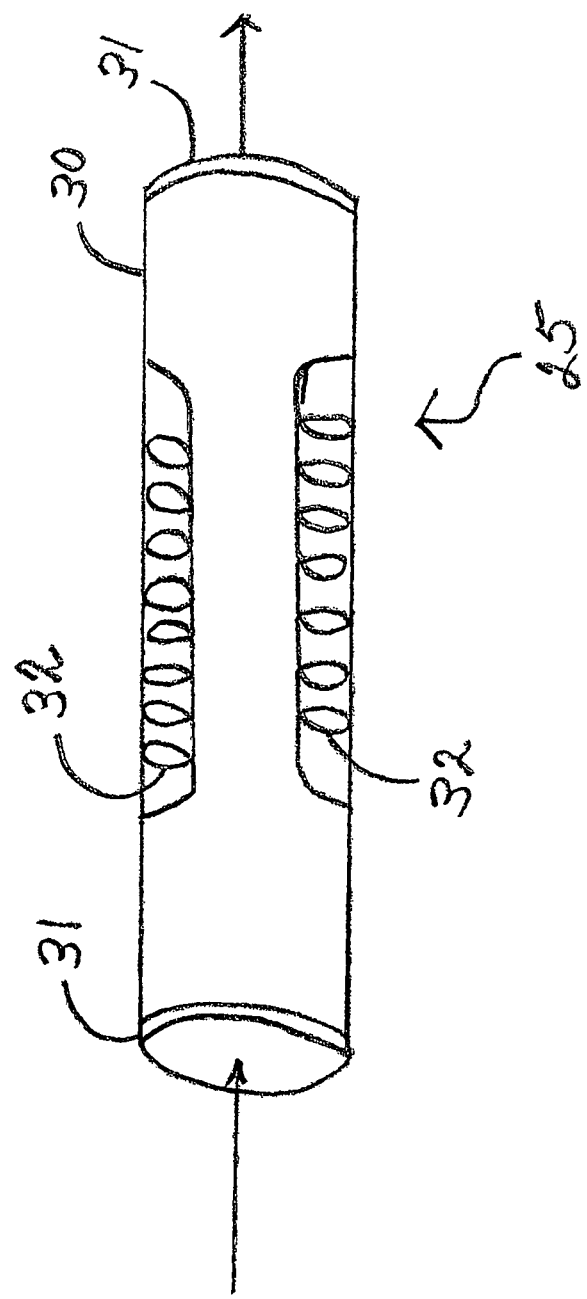
FIG. 3 is a representation of a rapid densification unit of the present invention.

Referring to FIG. 3, a rapid densification unit 25 of the present invention is represented. The rapid densification unit 25 comprises a sealed chamber 30. The sealed chamber 30 can be an elongated cylindrical heating tube with an opening at both ends. Each end of the tube can then be sealed with an airtight covering 31 once the fiber is placed in the tube. In an embodiment, the sealed chamber 30 can contain an inert atmosphere. The inert atmosphere can be nitrogen gas, argon gas or the like. However, it is not necessary to exclude oxygen, and air can be present in the sealed chamber 30. Inside the sealed chamber 30 are adjustable heating coils 32. The heating coils 32 are programmed to increase the temperature in a predefined heating cycle. Preferably, the predefined heating cycle begins at about 190 degrees C. and ends at about 400 degrees C.

Figure 4:
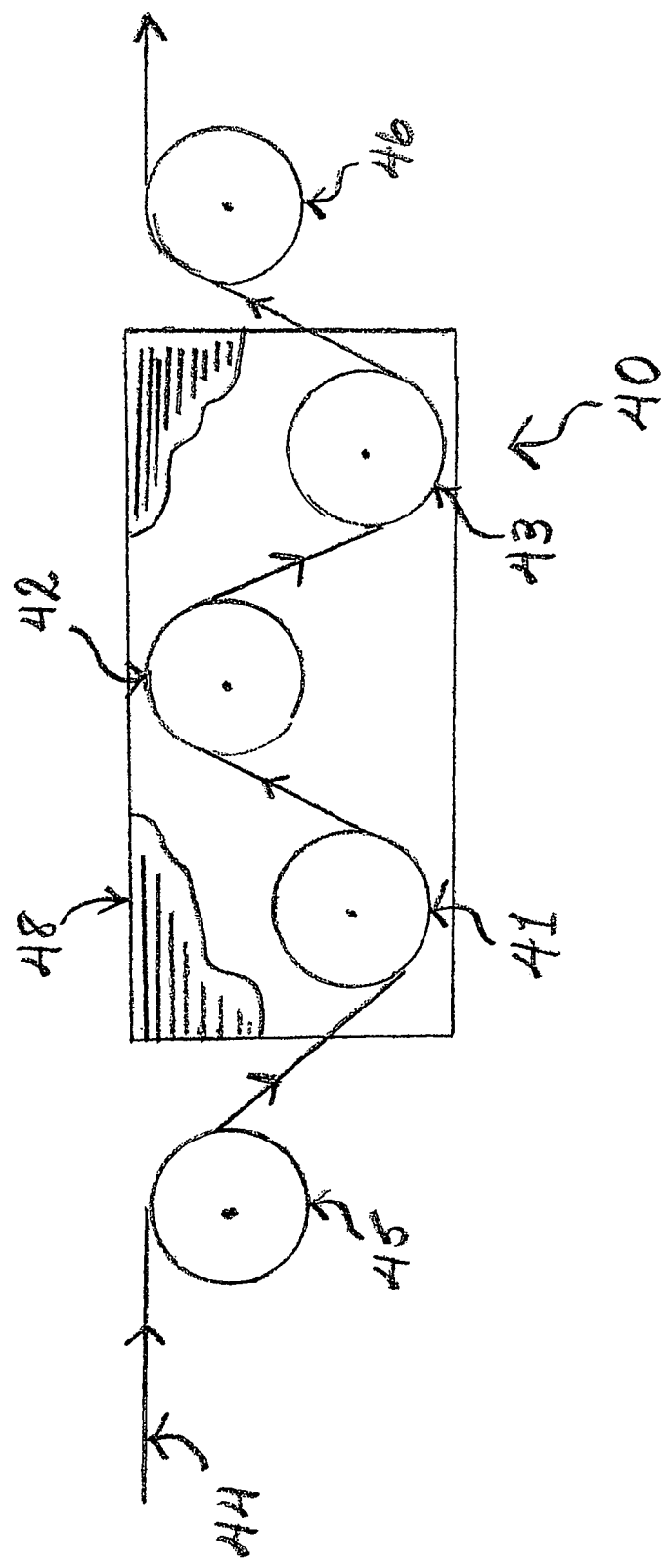
FIG. 4 is a representation of an alternative embodiment of the rapid densification unit of the present invention.

Referring to FIG. 4, a continuous process and apparatus for the rapid densification of an activator-loaded PAN fiber is represented. A rapid densification unit 40 comprises a set of three heating rolls (41, 42 and 43) maintained at sequentially higher temperatures. In an embodiment, the first heating roll 41 is maintained at a temperature of about 235 degrees C. to about 245 degrees C. The second heating roll 42 is maintained at a temperature of about 245 degrees C. to about 255 degrees C. The third heating roll 43 is maintained at a temperature of about 255 degrees C. to about 265 degrees C. It is within the scope of the present invention to employ other heating cycles, wherein the cycles are within the range of about 190 degrees C. to about 400 degrees C. Activator-loaded PAN fiber 44 passes over feed roll 45 and is taken up by first heating roll 41. The process of densification of the fiber 44 begins on the first heating roll 41. The fiber 44 is then moved to the second heating roll 42 for further densification. Finally, the fiber 44 is moved to the third heating roll 43 to complete the densification of the fiber. When the fiber 44 is removed from the third heating roll 43, it is advanced by uptake roll 46. The fiber density has increased from about 1.18 grams/cc to about 1.4 grams/cc. In an alternative embodiment, the set of three heating rolls (41, 42 and 43) can be located in a sealed container 48 in the absence of air. The sealed container is provided with an inert atmosphere such as nitrogen gas or argon gas.

PANOX fibers that have a density of less than about 1.4 g/cc. cannot be carbonized to obtain pristine carbon fiber because they will undergo a "flame-out" at carbonizing temperatures, such as 1000 degrees C. This is due to the volatiles that remain in the fiber.

The present invention relates to a process for preparing a PANOX fiber that does not undergo "flame-out" at carbonizing temperatures. PANOX fiber of the present invention also has an improved modulus, the modulus being up to 2 and ½ times higher than the modulus of prior art PANOX fibers. This increase in modulus is a result of less oxidative degradation of the fiber during the heating cycle in the densification unit. Heat release begins at a much lower temperature than in the prior art. The internal heat of the PANOX fiber is released over a wide range (about 100 degrees) of heating. The heat release is also conducted over a substantially longer time interval, rather than a sharp spike. The internal heat of the fiber, generated because of chemical cross-linking reactions, is removed in about 15 minutes rather than a spike of 3 seconds. The entire densification step is therefore conducted about three to five times faster than in prior art methods of oxidatively preparing PANOX fibers.

In the present invention, improvement begins with the first step of the carbon fiber process, the first step being the polymerization of monomers. In a preferred embodiment, monomers chosen for polymerization are acrylonitrile and itaconic acid. The itaconic acid is present in an amount of about 2% by weight to about 8% by weight. Preferably, the amount of itaconic acid is about 5% by weight. Itaconic acid is a dicarboxylic acid, and therefore supplies twice as many anchors for retaining amine (or ammonia) catalyst as does (meth)acrylic acid or the like. Most preferably, monomers are present in the following amounts: 95% by weight acrylonitrile and 5% by weight itaconic acid. The monomers are polymerized by a reaction such as a precipitation polymerization reaction or a solution polymerization reaction. Most preferably, a precipitation polymerization reaction in aqueous phase is employed. The precipitation polymerization is conducted in the presence of a catalyst regime comprising ammonium persulfate, potassium bisulfite and about 10 ppm iron. The amount of iron catalyst is kept at a minimum to avoid polymer degradation. An azo initiator can also be employed. The reaction is conducted at a temperature of about 60 degrees C. to about 80 degrees C. An aluminum shell reactor containing a water jacket shell can be employed.

A solution polymerization reaction can be employed. The catalysts for the reaction are preferably an azo initiator and ferrous ammonium sulfate. The reaction is conducted at a temperature of about 60 degrees C. to about 80 degrees C. The reaction is conducted for a time of about 20 minutes to about 90 minutes. Preferably, the reaction is conducted for a time of about 60 minutes.

When the polymerization reaction is complete, the reaction mixture is filtered to remove water. A polyacrylonitrile (PAN) copolymer is recovered from the filtration process. A filter cake is formed. The filter cake is re-slurried in water. Water is removed by decantation or the like. The copolymer is dried to a powder in a drying unit. Preferably, the dry powder is obtained by dropping copolymer noodles onto a porous moving belt. Hot air passing through the belt dries the noodles of copolymer. Noodles are then pulverized to obtain the dry powder.

A mixer can be employed to form a spin dope. Preferably, the spin dope formation unit is a MARCO MIXER. The acrylonitrile dry powder is added to the MARCO MIXER, along with dimethylformamide (DMF), which is sprayed into the mixer. The mixer is heated to a temperature of about 60 degrees C. to about 100 degrees C. A mixture of acrylonitrile copolymer and DMF is formed, the mixture having the consistency of honey. In an alternative embodiment, DMF can be replaced with DMAC (dimethylacetamide).

The mixture of acrylonitrile copolymer and DMAC (dimethylacetamide) is then removed to an extrusion unit. An aqueous bath of DMAC (or DMF) and copolymer is then formed. The aqueous bath, called a coagulation bath, is maintained at a temperature of about 25 degrees C. to about 50 degrees C. Fine filaments of copolymer are extruded through a die plate from the coagulation bath. The filaments have a dernier of about 1 to about 8. The extrusion unit can be a dry spinning operation or a wet spinning operation. Preferably, a conventional wet spinning apparatus is employed. Any metal-containing, or metal ion-containing, solvents are avoided. Wet spinning of the spin dope allows formation of gel filaments that have a substantially circular cross-section.

The filaments are transferred to an aqueous imbibation bath without removal of solvent. Filaments are in the gel state, and have an amorphous character. The imbibation bath contains an activator which is a member selected from the group consisting of a low molecular weight primary amine, a low molecular weight secondary amine and ammonia. By "low molecular weight" is meant an amine that contains a C1 to C6 aliphatic group. Preferably, ammonia is the activator. The ammonia is present in the imbibation bath in an amount of about 1% by volume to about 5% by volume. Ammonia activator must be present in the imbibation bath in an amount sufficient to neutralize all of the carboxylic acid groups present in the acrylonitrile copolymer. The carboxylic acid groups are due to the presence of the itaconic acid monomer in the copolymer. The imbibation bath, an aqueous bath that contains activator, is maintained at a temperature of about 50 degrees C. to about 70 degrees C. Preferably, the temperature of the imbibation bath is about 60 degrees C. The speed of the filaments traveling through the imbibation bath is in the range of about five yards per minute to about two hundred yards per minute. Speeds are adjusted to obtain optimum results. The imbibation bath is similar to the dye bath apparatus disclosed and claimed in U.S. Pat. No. 3,944,386, issued to Wilkinson.

Ammonia activator uniformly penetrates the gelled filaments. The ammonia activator forms a salt with the carboxylic acid groups of the itaconic acid present in the PAN copolymer. The amount of itaconic acid (or the like) in the copolymer determines the amount of activator (ammonia) "imbibed" into the filaments. The activator is homogeneously dispersed in each filament. Ammonium (or amine) salt remains unreacted and uniformly dispersed on a molecular basis until the copolymer is heated to a temperature of about 160 degrees.

Filaments removed from the imbibation bath are preferably passed into a filament collection unit which gathers the filaments into a fiber. Larger tows can also be formed. The thus formed fiber or tow is passed into a solvent extraction zone which comprises an aqueous bath. Within the aqueous bath is a device for drawing the fiber. This device can be a set of tensioning rollers. As the fiber enters the solvent extraction zone, solvent is washed from the fiber. The fiber is also drawn in a range of about 7× to about 9× to obtain a drawn fiber.

In an optional step, the drawn fiber is passed to a relaxation zone where the fiber is relaxed at least about 8%. The relaxation zone preferably contains a set of steamed rollers. Water passes through the rollers that are heated to a temperature of about 100 degrees C. The rollers have multiple outlets for steam. Steam contacts the drawn fiber as it passes over the set of steamed rollers. As a result of the contact, the fiber is relaxed.

Fiber is then passed into a rapid densification zone. Densification of the fiber in the rapid densification zone can be performed in the absence of air or oxygen. The theory is that oxygen does not cause the crosslinking, but rather that the ammonia activator, upon gentle heating, forms amidine moieties within the polyacrylonitrile copolymer. The amidine moieties are the true initiators that cause densification of the fiber.

Because the amine activator (preferably ammonia) is homogeneously dispersed throughout the PAN fiber, it is easy for the fiber to be heated in a short heating cycle, all the while keeping the temperature below the fusion point of the acrylonitrile copolymer.

In an embodiment of the present invention, the rapid densification unit can be a standard oven, such as a cylindrical heating tube, that can provide heat for a time of about 8 minutes to about 15 minutes. The temperature at the start of the densification process is about 190-200 degrees C. The final temperature at the end of the short heating cycle is about 400 degrees C. A densified PAN fiber (a PANOX fiber) is removed from the rapid densification zone. The density of the PANOX fiber is about 1.4 grams/cc.

In an embodiment of the present invention, the densified fiber (PANOX fiber) is removed to a carbonization unit. The PANOX fiber is carbonized in an inert atmosphere (eg., nitrogen gas) to obtain superior carbon fiber. The temperature of the carbonization unit is maintained at about 1800 degrees C. to about 4000 degrees C. Preferably, the temperature is about 2000 degrees C. Density of the carbon fiber is about 1.78 grams per cc. to about 1.8 grams per cc. Carbonization is completed in about two minutes. The carbonization operation can be compared to an incandescent light bulb, where a filament is stretched between two electrodes.

In the past, the densification step has been conducted for a time of about 1 to about 5 hours. The step is slow and adds significant expense to the overall process. Process temperatures must be maintained below the fusion point of the fibers to prevent instantaneous temperature surges within the fiber. Temperature surges produce bubbles of gaseous products which ruin the physical properties of the carbon fiber. The prior art densification step is conducted in an oxidizing atmosphere, usually in air, at a temperature of about 190 degrees C. to about 280 degrees C. The reaction is an exothermic one, and a runaway reaction is always possible.

It is another object of the present invention to provide a product comprising an acrylonitrile copolymer which is substantially free of metal ions and sulfonic acid groups. The product is further characterized by being prepared from acrylonitrile in an amount of about 95% to about 98% based on weight; and vinyl carboxylic acid monomer in an amount sufficient to retain in the copolymer ammonium ion or amine catalyst in amounts of about 1% to about 4% based on molar ratio, and, optionally, a vinyl carboxylic acid ester monomer in an amount up to about 2% based on weight.

Once the acrylonitrile copolymer product is obtained, it can be sold as a precursor powder for preparation of a PANOX fiber in a rapid densification stage. In an alternative embodiment, the copolymer product can be wet spun, treated in an activator-containing aqueous imbibation bath and then drawn to obtain an activator-loaded PAN fiber. Such a fiber can then be sold as a PANOX precursor fiber. The fiber can undergo a rapid crosslinking at both the intramolecular and intermolecular level. Rapid crosslink allows for swift increase in temperature without detrimental side effects that would damage the fiber.

PANOX fiber prepared from activator-loaded PAN fiber by a rapid densification process has superior physical properties. The PANOX fiber is useful as reinforcement material in automobile, aerospace, recreational and various other industries. An increasing demand for strong lightweight materials insures an expanded use of carbon fiber in the future. A fine quality acrylonitrile copolymer, such as described above, has no defects. A common defect is formation of voids in a fiber when gases are expelled during fiber preparation.

Carbon fibers, which have heretofore been used as reinforcing material for plastic composite compositions, are characterized by high tensile strength, high rigidity and a homogeneous fibrous structure. These characteristics can be adversely affected by certain properties found in the acrylonitrile copolymer feedstocks. If these undesirable properties can be identified and removed, then the final carbon fiber product is greatly enhanced in desirable characteristics Prior art processes employ a minor amount of itaconic acid (less than 2% by weight) when preparing the PAN copolymer. Itaconic acid is employed along with a neutral monomer, eg., methyl methacrylate, to improve plastic flow and limit formation of internal bubbles in the fiber. The present invention differs from the prior art in that it employs an amount of itaconic acid that is at least about 2% by weight. The itaconic acid of the present process is employed to control spacing of the activator along the backbone of the PAN copolymer.

Neutral monomers slow down the densification reaction, and should therefore be avoided. Examples of neutral monomers are methyl and ethyl carboxylates. The polyacrylonitrile copolymer is substantially free of metal ions and of groups which retain metal ions, other than the necessary carboxylic acid groups. An example of a group which retains metal ions is the sulfonic acid group. Thus, vinyl sulfonic acid should not be employed as a comonomer when the polyacrylonitrile copolymer is prepared.

In a preferred embodiment, a precipitation polymerization is employed to produce the PAN copolymer. Such a process is disclosed in U.S. Pat. No. 5,364,581, incorporated herein by reference.

The vinyl carboxylic acid comonomer which is employed in preparing the PAN copolymer is a member selected from the group consisting of itaconic acid, acrylic acid and methacrylic acid. Preferably, itaconic acid is the comonomer. It is within the scope of the present process to use more than one comonomer. The only restriction imposed on the present process is that a vinyl sulfonic acid comonomer, allyl sulfonic acid monomer, salts thereof, or the like, cannot be included in the feedstock compositions. It has been observed that the presence of sulfonic acid groups in the final acrylonitrile copolymer causes retention of metal ions. The feedstock for use in the present process must be substantially free of sulfonic acid groups. By substantially free of sulfonic acid groups is meant that there is present in the final acrylonitrile copolymer not more than 0.5 mole % sulfonic acid groups. Also, when sulfonic acid groups are replaced by carboxyl groups in the final acrylonitrile copolymer, the densification rate during PANOX fiber preparation is increased.

When precipitation polymerization is employed, fibers can be subjected to wet spinning without any pre-treatment. Wet spinning is preferred because it yields round fibers which give better physical properties to the final carbon fiber. If wet spinning is performed, care must be taken to avoid the use of metal or metal-ion containing solvents. Aqueous sodium thiocyanate and aqueous zinc chloride should not be employed in the wet-spinning process. Examples of preferred solvents for wet spinning are dimethyl sulfoxide, dimethylformamide, dimethylacetamide, tetramethylene cyclic sulfone, aqueous ammonium thiocyanate and aqueous ethylene carbonate.

The densification activator must be free of metal or metal ions. The densification activator is a member selected from the group consisting of ammonia and low molecular weight primary or secondary amines. By low molecular weight amine is meant a C1 to C6 aliphatic amine.

The objective of the densification step in the preparation of PANOX fiber or carbon fiber is to increase the density of the fiber to about 1.4 g/cc. The PAN-fiber, prior to densification, has a density of about 1.18 g/cc. Two factors that contribute to increase in density of the fiber during the densification step are: (1) removal of volatile components, and (2) cross linking of the polyacrylonitrile copolymer.

A requirement for a more efficient densification step in the process for preparing PANOX fiber or carbon fiber is the formation of crosslinks in the precursor polyacrylonitrile copolymer. The sticking temperature of the copolymer is raised in proportion to the number of crosslinks formed in the copolymer. Broadly, the sticking temperature of polymer particles in a fluidized bed is defined as the temperature at which fluidization ceases due to agglomerization of the particles in the bed. A polymer can be inherently sticky due to its chemical or mechanical properties or pass through a sticky phase during the production cycle. The flow factor references the flow of all materials to that of dry sand. On a scale of 1 to 10, dry sand scores a 10. Sticky polymers are usually 1-3, and free flowing polymers are usually 4-10.

In the present process, effective cross-links are obtained by the use of ammonia. If air is employed as the sole activator, as in the prior art processes, the polyacrylonitrile copolymer itself is degraded, giving mixtures of amines. Amines cause formation of amidines by reactions with cyano groups in the polyacrylonitrile copolymer. However, the mixture of amines causes formation of non-homogeneous crosslinks. Non-homogeneous cross-links result in uneven physical properties throughout the fiber. The use of ammonia as sole activator assures formation of homogeneous cross-links.

An increased amount of carboxylic acid groups in the PAN copolymer allows for retention of more ammonia activator. Once the fusion point of the PAN copolymer is reached (about 280.degrees C.), heat release of the copolymer skyrockets, reaching extremely high exothermic conditions. Rapid release of volatiles leads to poor physical properties in the carbon fiber product. If there is a relatively low amount of ammonium ion retained by the copolymer, heat release of the copolymer climbs rapidly to high exothermic conditions once the fusion temperature is reached.

An advantage of the ammonia is that it leaves no residue upon cross-linking. Cross-linking agents containing metal cations such as sodium, potassium or zinc leave a residue after reaction. PAN fibers cross-linked in the presence of ammonium ion reach an end point density of 1.4 g/cc more quickly than fibers cross-linked in the presence of sodium ions. Also, PAN fibers prepared from copolymers devoid of neutral monomers such as methyl methacrylate are more readily crosslinked. Increased density of the PAN fiber depends upon two factors: (1) amount of ammonium ion activator present in the PAN fiber, and (2) surface area of the fiber. A fiber with a large surface area is much more difficult to crosslink.

In an embodiment, the present invention relates to a PANOX fiber. The PANOX fiber is prepared according to a process comprising: obtaining an acrylonitrile copolymer, wherein the copolymer comprises about 92% by weight to about 98% by weight acrylonitrile monomer and about 2% by weight to about 8% by weight vinyl carboxylic acid monomer, and wherein the acrylonitrile copolymer is substantially free of components selected from the group consisting of metals, metal ions and vinyl sulfonic acid monomers; adding the acrylonitrile copolymer to a solvent which is a member selected from the group consisting of DMF and DMAC to obtain an emulsion; and adding the emulsion to a wet spinning zone, wherein the wet spinning zone comprises a die plate. The process further comprises the steps of spinning the emulsion through the die plate to obtain gelled filaments, wherein the gelled filaments have a substantially circular cross-section; adding the gelled filaments to an aqueous imbibation bath, wherein the filaments are under minimum tension, and wherein the aqueous imbibation bath comprises an activator which is a member selected from the group consisting of low molecular weight primary amine, low molecular weight secondary amine and ammonia; and imbibing the gelled filaments with the activator to obtain activator-loaded gelled filaments. The process further comprises the steps of withdrawing the activator-loaded gelled filaments from the aqueous imbibation bath; bundling the activator-loaded gelled filaments to obtain an activator-loaded fiber; and adding the activator-loaded fiber to a solvent extraction zone. The solvent extraction zone comprises an aqueous draw bath and a device for drawing the fiber. Preferably, the device for drawing the fiber is a set of tensioning rolls. In an alternative embodiment, a plurality of sets of tensioning rolls can be employed as the device for drawing the fiber. Solvent is removed from the activator-loaded fiber in the solvent extraction zone. The activator-loaded fiber is drawn on the drawing device in a range of about 7× to about 9× its original length while in the aqueous draw bath to obtain a drawn fiber. The drawn fiber has a density of about 1.18 grams per cubic centimeter. The process further comprises adding the drawn fiber to a rapid densification unit; and heating the drawn fiber for about 8 minutes to about 15 minutes. Preferably, the heating is conducted by employing a heating cycle beginning at about 190 degrees C. and ending at about 400 degrees C. A PANOX fiber is obtained, the density of the PANOX fiber being in a range of about 1.40 grams per cubic centimeter to about 1.5 grams per cubic centimeter. In an embodiment, the PANOX fiber can be added to a carbonization unit and heated in an inert atmosphere at a temperature in a range of about 1000 degrees C. to about 2000 degrees C. or above for a time of about one to two minutes to obtain a pristine carbon fiber.

The present invention relates to an apparatus for preparing PANOX fiber. The apparatus comprises: a spin dope formation unit, a spinning unit, an aqueous imbibation unit, a solvent extraction unit, and a rapid densification unit. The apparatus further comprises: a first transfer means operatively connecting the spin dope formation unit to the spinning unit, a second transfer means operatively connecting the spinning unit to the aqueous imbibation unit, a third transfer means operatively connecting the aqueous imbibation unit to the solvent extraction unit, and a fourth transfer means operatively connecting the solvent extraction unit to the rapid densification unit.

The rapid densification unit of the apparatus preferably comprises a set of three heating rolls. The set of three heating rolls comprises a first heating roll maintained at a temperature of about 235 degrees C. to about 245 degrees C., a second heating roll maintained at a temperature of about 245 degrees C. to about 255 degrees C., and a third heating roll maintained at a temperature of about 255 degrees C. to about 265 degrees C.

In a preferred embodiment, the first heating roll is maintained at a temperature of about 240 degrees C., the second heating roll is maintained at a temperature of about 250 degrees C., and the third heating roll is maintained at a temperature of about 260 degrees C.

EXAMPLE

Into a round bottom 1000 ml flask, equipped with a magnetic stirrer, is added 500 ml distilled water. Acrylonitrile in an amount of 1,235 g (23.3 moles) is added to the water. Itaconic acid in an amount of 65 g (0.5 moles) is added to the aqueous solvent. A catalytic amount of ammonium persulfate and potassium bisulfite is added to the aqueous solvent. A micro-amount of catalytic iron (about 10 ppm) is also added to the aqueous solvent.

The aqueous mixture of acrylonitrile, itaconic acid, ammonium persulfate, potassium bisulfite, and iron is stirred for about 15 minutes. The stirred solution is then removed to an aluminum shell reactor, the reactor surrounded by a water-jacket shell. The reactor is heated to about 80° C. for a time of about 30 minutes. A copolymer of acrylonitrile and itaconic acid is formed as by a precipitation polymerization. Heat of reaction is controlled by the water jacket shell.

After the precipitation polymerization reaction is complete, the aqueous dispersion of PAN copolymer is removed from the reaction mixture by filtration. A filter cake comprising the PAN copolymer is formed.

The filter cake is re-slurried in distilled water. The water is then decanted off. The PAN copolymer is then dried to a powder in a drying unit.

Powder of PAN copolymer is added to a MARCO MIXER, along with dimethylformamide (DMF) which is sprayed into the mixer. Mixing begins, as the temperature is increased to 100° C. The mixture of copolymer and DMF is continuously stirred for about 1 hour.

After an hour, the coagulation bath of PAN and DMF has a consistency of honey. The coagulation bath is transferred to a wet spinning unit for extrusion through a die plate containing 2100 holes. The wet spinning operation is conducted at a temperature of about 50° C. Fine gel filaments of PAN copolymer are obtained from the wet spinning unit.

Gelled filaments are transferred to an imbibation bath comprising water and ammonia. The temperature of the imbibation bath is about 60 degrees C. The ammonia is present in an amount of about 10 volume %.

After removal from the imbibation bath, gelled filaments, which are loaded with ammonia in the form of the ammonium salt of a carboxylic acid group, are added to a bundling device such as an uptake roll where they are bundled or combined to obtain an activator-loaded PAN fiber.

Activator-loaded PAN fiber is then removed to a solvent extraction zone comprising an aqueous bath and a fiber drawing unit. The fiber drawing unit is within the aqueous bath. The fiber drawing unit is a set of tensioning rolls. The aqueous bath is heated to a temperature of about 100° C. While immersed in the bath, the PAN fiber is drawn about 7×. Also, solvent is removed from the PAN fiber.

Drawn PAN fiber, which is substantially solvent-free, is withdrawn from the solvent extraction zone. The PAN fiber is taken up by a set of relaxation rollers, operating at a temperature of about 100° C., and coated with water.

The relaxed PAN fiber is transferred to a rapid densification unit. The rapid densification unit comprises a set of three heated rollers. The first heated roller is maintained at a temperature of about 240° C. the second heated roller is maintained at a temperature of about 250° C. The third heated roller is maintained at a temperature of about 260° C. The relaxed PAN fiber passes over the three rollers at a speed of about 5 ypm (yards per minute). A PANOX fiber is removed from the third heated roller by an uptake roll.

While the invention has been described by a specific example and various embodiments, there is no intent to limit the inventive concept except as set forth in the following claims.

I claim:

1. A PANOX fiber including activator-loaded gelled filaments, the fiber prepared according to the process comprising:
   (a) obtaining an acrylonitrile copolymer, wherein the copolymer comprises about 92% by weight to about 98% by weight acrylonitrile monomer and about 2% by weight to about 8% by weight vinyl carboxylic acid monomer, and wherein the acrylonitrile copolymer is substantially free of components selected from the group consisting of metals, metal ions and vinyl sulfonic acid monomers;
   (b) adding the acrylonitrile copolymer to a solvent which is a member selected from the group consisting of DMF and DMAC to obtain an emulsion;
   (c) adding the emulsion to a wet spinning zone, wherein the wet spinning zone comprises a die plate;
   (d) spinning the emulsion through the die plate to obtained gelled filaments, wherein the gelled filaments have a substantially circular cross-section;
   (e) adding the gelled filaments to an aqueous imbibition bath, wherein the filaments are under minimum tension, and wherein the aqueous imbibition bath comprises an activator which is a member selected from the group consisting of low molecular weight primary amine, low molecular weight secondary amine and ammonia;
   (f) imbibing the gelled filaments with the activator to obtain activator-loaded gelled filaments;
   (g) withdrawing the activator-loaded gelled filaments from the aqueous imbibition bath;
   (h) bundling the activator-loaded gelled filaments to obtain an activator loaded fiber;
   (i) adding the activator-loaded to a solvent extraction zone comprising an aqueous draw bath and a device for drawing the fiber, wherein solvent is removed from the activator-loaded fiber;
   (j) drawing the activator-loaded fiber to obtain n7 times to about 9 times, while in the aqueous draw bath to obtain a drawn fiber, wherein the drawn fiber has a density of about 1.18 grams per cubic centimeter;
   (k) adding the drawn fiber to a rapid densification unit; and
   (l) heating the drawn fiber for about 8 minutes to about 15 minutes, wherein the heating is conducted by employing a heating cycle beginning at about 190 degrees C., and ending at about 400 degrees C., to obtain the PANOX fiber, and wherein the density of the PANOX fiber is in the range of about 1.40 grams per cubic centimeter to about 1 5 grams per cubic centimeter.

* * * * *